US006381659B2

(12) United States Patent
Proch et al.

(10) Patent No.: US 6,381,659 B2
(45) Date of Patent: *Apr. 30, 2002

(54) METHOD AND CIRCUIT FOR CONTROLLING A FIRST-IN-FIRST-OUT (FIFO) BUFFER USING A BANK OF FIFO ADDRESS REGISTERS CAPTURING AND SAVING BEGINNING AND ENDING WRITE-POINTER ADDRESSES

(75) Inventors: Timothy Proch, Shrewsbury; Nick Horgan, Marlboro, both of MA (US)

(73) Assignee: Maxtor Corporation, Longmont, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/232,764

(22) Filed: Jan. 19, 1999

(51) Int. Cl.[7] .......................... G06F 12/02; G06F 5/06; G06F 13/12; H04J 3/02; G11C 7/00
(52) U.S. Cl. .............................. 710/57; 710/36; 710/20; 710/21; 710/53; 710/52; 710/56; 711/100; 711/147; 711/173; 703/13
(58) Field of Search ............................ 710/52, 36, 20, 710/21, 57, 53; 711/173, 147, 100; 340/825.02; 365/78, 221; 345/506; 370/463

(56) References Cited

U.S. PATENT DOCUMENTS 4,847,615 A  *  7/1989  McDonald ............. 340/825.02
4,949,301 A  *  8/1990  Joshi et al. ................. 711/100

(List continued on next page.)

FOREIGN PATENT DOCUMENTS

EP           0391584 A2  *  10/1990  ............. G06F/5/06

OTHER PUBLICATIONS

Zukowski et al. "VLSI Implementations of ATM Buffer Management", Communications, 1991. ICC '91, Conf. Record, IEEE Int. Conf. on, 1991, pp. 716–720 v. 2.*

(List continued on next page.)

*Primary Examiner*—Thomas Lee
*Assistant Examiner*—Chun Cao
(74) *Attorney, Agent, or Firm*—David M. Sigmond

(57) ABSTRACT

A method and circuit for controlling a FIFO buffer such that the buffer can accommodate more than one data block simultaneously without overlapping data between adjacent data blocks. The FIFO buffer has a read-pointer address register and a write-pointer address register and a bank of write-capture registers including at least a first pair and a second pair. The first pair of registers captures and saves the write-pointer addresses associated with the beginning and ending of a first data block written to the FIFO buffer register while the second pair of registers captures and saves the write-pointer addresses associated with the beginning and ending of a second data block written to the FIFO buffer. The first pair and second pair alternate in capturing and saving beginning and ending addresses of a plurality of data blocks written to the FIFO buffer. In reading data from the FIFO buffer, the read pointer address register is loaded with the previously saved write-pointer address associated with the beginning of each data block that is subsequently read. Since both the beginning and ending write-pointer addresses associated with each data block are captured and saved, the system reading from the FIFO buffer delineates between adjacent data blocks, thereby eliminating data overlap or FIFO interruption.

23 Claims, 5 Drawing Sheets

U.S. PATENT DOCUMENTS

| | | | |
|---|---|---|---|
| 5,062,073 A | * 10/1991 | Masuda et al. | 710/36 |
| 5,133,062 A | * 7/1992 | Joshi et al. | 703/13 |
| 5,267,191 A | * 11/1993 | Simpson | 365/78 |
| 5,305,319 A | * 4/1994 | Sowell | 370/63 |
| 5,365,485 A | * 11/1994 | Ward et al. | 365/221 |
| 5,432,908 A | * 7/1995 | Heddes et al. | 711/147 |
| 5,781,802 A | 7/1998 | Cassetti | 395/877 |
| 5,809,557 A | * 9/1998 | Shemla et al. | 711/173 |
| 5,889,533 A | * 3/1999 | Lee | 345/506 |

OTHER PUBLICATIONS

Fenstermaker et al. "A Low–Power Generator–Based FIFO Using Ring Pointers and Current–Mode Sensing", Solid–State Cir. Conf., 1993. Digest of Tech. Papers. 40th ISSCC., IEEE, pp. 242–243, 295.*

* cited by examiner

| FIG. 3a | FIG. 3b |

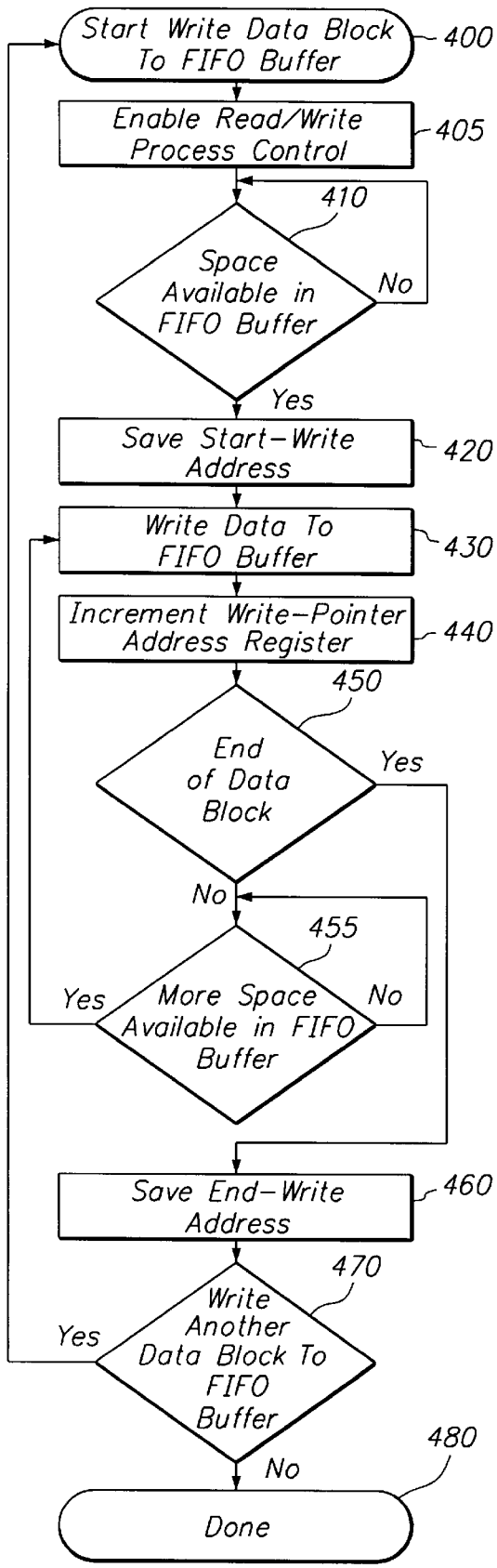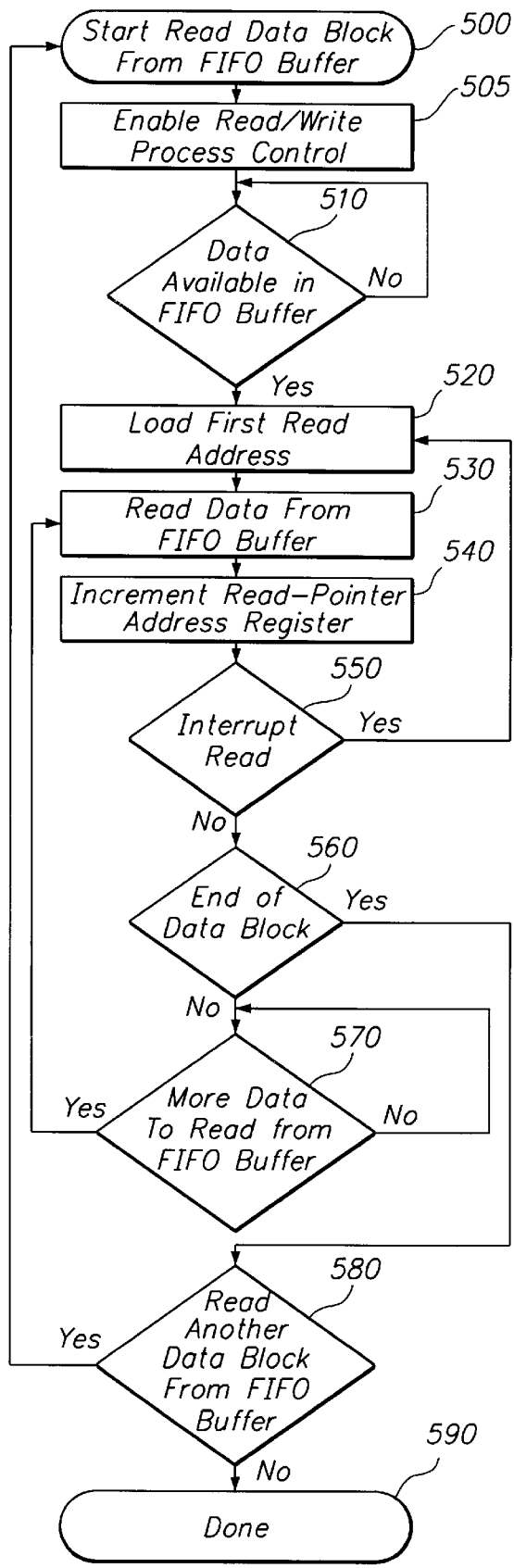
FIG. 4
FIG. 5

METHOD AND CIRCUIT FOR CONTROLLING A FIRST-IN-FIRST-OUT (FIFO) BUFFER USING A BANK OF FIFO ADDRESS REGISTERS CAPTURING AND SAVING BEGINNING AND ENDING WRITE-POINTER ADDRESSES

FIELD OF THE INVENTION

The invention relates generally to controlling a first-in-first-out (FIFO) buffer and more precisely to a FIFO controller for buffering a plurality of disparate data blocks or entities flowing between asynchronous data processes in a manner preventing overlap or corruption of data.

BACKGROUND OF THE INVENTION

FIFO structures are well known for buffering data passing between two data handling processes which operate asynchronously with respect to each other. A FIFO memory is a structure wherein data words, objects, blocks, or entities are taken out of the structure in the order of receipt. A sender places data objects into the FIFO structure, while a receiver collects the objects from the structure.

Referring to FIG. 1, generally, a first-in-first-out (FIFO) buffer 44 is used to provide temporary storage for data that is being transferred between two or more asynchronous data processing systems. These data processing systems typically have specialized clocking circuits, e.g. Clk-1 and Clk-2 operating at predetermined frequencies (phases) which are asynchronous with respect to each other. The FIFO buffer 44 shown in the FIG. 1 example is, for example, a dual port memory array having a preferred row dimension of thirty two bits wide with thirty two rows in height or depth (i.e. a 32 by 32 memory array).

One typical data processing system is a disk-type magnetic recording system or disk drive 30. The disk drive 30 uses a magnetic transducer element, or head 31 to record information onto (i.e., write) and to retrieve information from (i.e., read) a magnetic medium formed on a surface of a rotating disk 32. Each storage disk 32 comprises an annular substrate onto which is deposited a magnetic recording medium. Although FIG. 1 shows a single head 31 and disk 32, in practice multiple storage surfaces and heads are frequently employed. In the FIG. 1 example the storage surface of disk 32 is divided into thousands of concentric, annular bands, or "tracks" 33 each having a predetermined radial extent. Each head 31 is supported in close proximity to an associated disk 32 surface by a head positioning assembly, or actuator 34, that supports the head 31 near the disk 32 surface and moves it from one radial position to another, thereby permitting use of a single head 31 for reading and writing along each of the multiple concentric tracks 33. The positioner assembly 34 for each head 31 or group of heads 31 includes an actuator arm 35 and an actuator motor 36. The actuator motor 36 moves the actuator arm 35 to change the position of the head 31 with relation to the tracks 33 on the disk 32. A disk drive 30 having a plurality of disks 32 stacked on a common spindle will typically employ a single actuator motor 36 to move a corresponding number of ganged-together actuator arms 35 and heads 31 in unison. A disk controller (not shown) controls operations of the disk spindle and the actuator motor 36.

The disk drive 30, further includes a disk channel 37, such as a partial-response maximum-likelihood (PRML) synchronous sampling data detection channel, for encoding, detecting, decoding and controlling flow of data read from or written to the disk 32 at a data rate in accordance with a disk clock CLK-1. The disk clock CLK-1 may remain fixed, or it may be varied as a function of radius of a particular data track 33 (since relative rotational velocity varies with track radius). The disk drive 30 typically transmits data back and forth between itself and a random-access-memory (RAM) buffer 25. The RAM buffer 25 includes one or a plurality of electronic data storage integrated circuit memory chips for storing data therein. The RAM buffer 25 is coupled with a RAM Port 26. The RAM Port 26 is coupled to the disk drive 30 via a disk-direct-memory-access (DDMA) 40, which is defined within the disk drive 30. The RAM Port 26 circuit is further connected to several other clients including: a RAM buffer manager 24; a standard bus interface 28, such as a Small-Computer-System Interface (SCSI), which connects to a host computer 22 and also may be connected as well as to several other clients (n). The RAM Port 26 circuit provides access arbitration among the clients seeking access to the RAM buffer 25, including the DDMA 40, host interface 28 and other clients (n) such as a disk drive controller.

The DDMA 40 generally includes a RAM Port Interface circuit 42, a FIFO buffer 44, and a disk interface circuit 45. The RAM Port interface 42 communicates data as well as control information to the RAM buffer 25 via the RAM Port 26 and RAM buffer manager 24. The FIFO buffer 44 is connected to the RAM Port Interface 42 circuit and acts as a temporary storage space for data that is in the process of being transferred to/from the disk drive 30 and the RAM 25. The disk interface circuit 45 is connected to the disk channel 37, via a bus 27, as well as to the FIFO buffer 44. The disk interface 45 operates to communicate data to/from the disk channel 37 and storage surface of disk 32.

The DDMA 40 further includes a disk read/write process control 41 and a RAM read/write process control 43. The disk read/write process control circuit 41 is connected to the disk interface 45 and is synchronous with CLK-1 of the disk channel 37. The RAM read/write process control circuit 43 is connected to the RAM Port interface 42 and is synchronous with a second clock CLK-2 used to write data to and from the RAM buffer 25. The disk and RAM read/write process control circuits 41, 43 enable the RAM Port interface 42 and the Disk Drive interface 45 to either read data from or write data to the FIFO buffer 44 depending on the direction of data flow between the RAM buffer 25 and the disk drive 30.

In a typical data transfer from the disk drive 30 to the RAM buffer 25, a plurality of data blocks written in tracks 33 are sensed as magnetic flux transitions by the head 31 and recovered as binary data by the disk channel 37. The recovered data is transmitted to the FIFO buffer 44 via the disk interface 45. Prior to writing data to the FIFO buffer 44, a write-pointer register 48 is preset to point to the first row of the FIFO 44. Next, the disk read/write process control circuit 41 is enabled for writing data to the FIFO buffer 44, and the RAM read/write process control circuit 43 is enabled for reading data from the FIFO buffer 44. Thereafter, the disk interface 45 begins writing 32-bit data segments to the FIFO buffer 44 synchronously with clock CLK-1. Additionally, the write-pointer address register 48 is incremented as each data segment is written into the FIFO buffer 44. Once the FIFO buffer 44 accumulates a predetermined number of data segments, a control signal is issued to the RAM Port Interface 42 indicating that the FIFO buffer 44 has data which needs to be read out.

At this point, the RAM Port Interface 42 arbitrates with the RAM Port 26 for direct access to the RAM buffer 25 via the RAM buffer manager 24. When access is granted to the RAM buffer 25, the RAM Port Interface 26 reads data out of the FIFO buffer 44 and transmits the data to the RAM buffer 25 via RAM buffer manager 24. Prior to the RAM Port Interface 42 reading data out of the FIFO buffer 44, a read-pointer address register 46 is preset to point to the beginning of data written into the FIFO buffer 44, i.e. the first row in this example. Thereafter, the RAM Port Interface 42 begins reading data segments from the FIFO buffer 44 in synchronism with clock CLK-2. The read-pointer address register 46 is incremented as each data segment is read from the FIFO buffer 44. Once the read-pointer address register 45 is incremented to point to a next buffer row, the present buffer row is free to be written with a next data segment of the data block being transferred.

Since the FIFO buffer 44 holds only 32 4-byte segments (128 bytes or 1024 bits) the buffer 44 typically cannot store an entire disk data block (e.g. 512 bytes or 4096 bits) at once. Accordingly, the FIFO buffer 44 is cycled (rolls over) several times during the transfer of a single block of data. After the data block is both written to and read from the FIFO buffer 44, the write-pointer address register 48 and the read-pointer address register 46 are reset and the above process is repeated for transferring a next data block from the disk drive 30 to the host 22.

In a typical data transfer from the RAM buffer 25 to the disk drive 30, a plurality of data blocks are transferred from the host 22 to the RAM buffer 25 and then the blocks of data are subsequently transferred to the FIFO buffer 44 via the RAM Port Interface 42. Similar to that of transferring data from the drive 30 to the RAM buffer 25, the FIFO buffer 44 presets the write-pointer register 48 to point to the beginning of the FIFO 44. Next, the RAM read/write process control circuit 43 is enabled for writing data to the FIFO buffer 44 while the disk read/write process control circuit 41 is enabled for reading data from the FIFO buffer 44. Thereafter, the RAM Port Interface 42 begins preemptively writing data segments to the FIFO buffer 44 in synchronism with clock CLK-2. This is to ensure that the data is available for transfer to the disk 32 when the head 31 arrives at the correct location over the disk 32. Additionally, the write-pointer address register 48 is incremented as each data segment is written into the FIFO buffer 44. Once the FIFO buffer 44 is filled, the RAM buffer 25 write process pauses and waits for space to become available in the FIFO buffer 44. Space becomes available in the FIFO buffer 44 as a result of the disk interface 45 read process, which reads data from the FIFO buffer 44 and sends the data to the disk channel 37 for subsequent storage on the disk 32. When sufficient space becomes available in the FIFO buffer 44, the process of transferring data from the RAM buffer 25 to the FIFO buffer 44 is resumed. This process is repeated until all data is transferred from the RAM buffer 25 to the disk 32.

Prior to the disk drive interface 45 reading data out of the FIFO 44, the read-pointer address register 46 is preset to the beginning of the FIFO buffer 44. Thereafter, the disk drive interface 45 begins reading data segments from the FIFO buffer 44 synchronously with clock CLK-1. Additionally, the read-pointer address register 46 is incremented synchronously with each data segment read from the FIFO buffer 44. After the data block is both written to and read from the FIFO buffer 44, the write-pointer address register 48 and the read-pointer address 44 are reset and the above process is repeated for transferring the next data block from the host 22 to the disk drive 30.

Generally, the asynchronous operating characteristics of both the RAM 25 and the disk drive 30 with respect to one another cause problems in transferring data therebetween. One such problem occurs as a result of having to reset the write-pointer address register 48 and the read-pointer address register 46 after each data block transfer. Another problem occurs due to the RAM Port interface 42 having to arbitrate to gain access to the RAM buffer 25. Collectively, this arbitration time and the time required to reset the write-pointer register 48 and read-pointer register 46 can cause the FIFO buffer 44 to reject reception of a second data block until the former data block is completely read out of the FIFO buffer 44 and the pointers 46 and 48 have been reset. In transferring data from the disk drive 30 to the RAM 25, this delay may result in forcing the disk drive 30 to wait until the FIFO buffer 44 is again receptive to receiving data. Such buffer access waiting period may cause the disk drive 30 incur another complete revolution of the storage disk 32 to arrive at the same data in a track 33 and then read the data. The wait associated with a second disk revolution to read a track is known in the art as "rotational latency", and excessive rotational latencies degrade disk drive system performance.

Conventional methods of solving this problem have been to simultaneously write to and read from the FIFO buffer 44 without resetting the pointer registers 46 and 48. However, this solution introduces additional problems when a first data block being written to the FIFO buffer 44 is aborted somewhere between the beginning and ending of the data block. When the transfer of the first data block is aborted and the writing of a second data block immediately follows, the read-pointer address associated with the tail end of the aborted first data block can overlap with the write-pointer address associated with the beginning of the second data block being written to the FIFO buffer 44. This data overlap condition causes data from the second data block to be erroneously transferred as data of the first data block.

Another problem occurs when writing a sequence of contiguous data blocks from the disk drive 30 to the FIFO buffer 44, via the disk interface 45, if there is insufficient space in the buffer 44 to accommodate the data. This full condition of the FIFO buffer 44 occurs when the RAM Port Interface 42 cannot read data out of the FIFO 44 fast enough to make room for data being written into the FIFO 44. If the FIFO buffer 44 does not have space for data being written thereto from the disk drive 30, an overflow condition occurs, which can result in a data transfer error.

A similar problem occurs when the RAM Port Interface 42 does not transfer a steady stream of data to the FIFO 44 such that the FIFO 44 runs out of data or underflows. This FIFO underflow condition again results in reduced performance of the disk drive 30, since the disk drive 30 has to incur another rotational latency delay in order to bring the data block track destination beneath the transducer head 31 for data writing during a second pass over the track 33.

Thus, a hitherto unsolved need has remained for a FIFO buffer control method and circuit that facilitates simultaneous multiple block writing to and reading from a FIFO buffer without data overlap. Additionally, a FIFO buffer control circuit and method is needed that does not require a write-pointer register and a read-pointer register to be reset after each data block transfer so that a plurality of contiguous data blocks, which are much larger than the FIFO storage capacity, can be seamlessly transferred back and forth between the disk drive and the host computer.

SUMMARY OF THE INVENTION

An object of the present invention is to provide a FIFO buffer control that enables an end of a first data block to occupy a FIFO buffer register simultaneously with a beginning of a second data block without data overlap, in a manner overcoming limitations and drawbacks of the prior art.

Another object of the present invention is to provide a FIFO buffer control that does not require the write-pointer or the read-pointer to be reset after each data block transfer.

In accordance with principles of the present invention, a FIFO buffer control circuit enables a FIFO buffer to simultaneously contain portions of plural adjacent data blocks without data overlap. During a process of transferring data blocks between a sending unit and a receiving unit asynchronously clocked with the sending unit, the FIFO control captures and saves a FIFO buffer write-pointer address that is associated with beginning of a first data block to be written to the FIFO buffer. After writing the first data block to the FIFO buffer, the FIFO control captures and saves a buffer write-pointer address associated with the end of the first data block. Next, the FIFO control captures and saves FIFO buffer write-pointer addresses associated with a beginning of a second data block to be written to the FIFO buffer. After writing the second block to the FIFO buffer, the FIFO buffer control captures and saves a buffer write-pointer address associated with the end of the second data block. This process is repeated for capturing and saving the write-pointer addresses associated with each successive data block written into the FIFO buffer.

Meanwhile, a read pointer address register of the FIFO buffer is loaded with the previously saved write pointer address that corresponds to the beginning of the first data block to be read. Thereafter, data is read from the FIFO buffer until the end of the first data block is detected. At this instant, the read pointer address register is loaded with the saved write-pointer address associated with the beginning of the second data block written to the FIFO buffer. Then, the second data block is read from the FIFO buffer until the end of the second data block is detected. This read process is repeated until all data blocks written into the FIFO buffer by the sending unit have been read out to the receiving unit.

Since the write-pointer address associated with the beginning and ending of each data block written to the FIFO buffer is captured and saved, successive data blocks can be sequentially written thereto without resetting the write-pointer address register. Additionally, since the read-pointer address register is loaded with the write-pointer address associated with the beginning of each data block, the read-pointer address does not have to be reset after each data block is read from the FIFO buffer. Most importantly, the FIFO control circuit enables segments of a plurality of data blocks to occupy the FIFO buffer register simultaneously without data overlap between such blocks, because the beginning and ending pointers of each data block have been previously captured and saved.

These and other objects, advantages, aspects and features of the present invention will be more filly understood and appreciated upon consideration of the following detailed description of a preferred embodiment, presented in conjunction with the accompanying drawings.

BRIEF DESCRIPTION OF THE DRAWINGS

In the drawings:

FIG. 4 is a flow chart illustrating a method of writing multi-block data to the FIG. 2 FIFO buffer according to principles of the present invention.

FIG. 5 is a flow chart illustrating a method of reading multi-block data from the FIG. 2 FIFO buffer according to principles of the present invention.

DETAILED DESCRIPTION OF A PREFERRED EMBODIMENT

Figure 1:
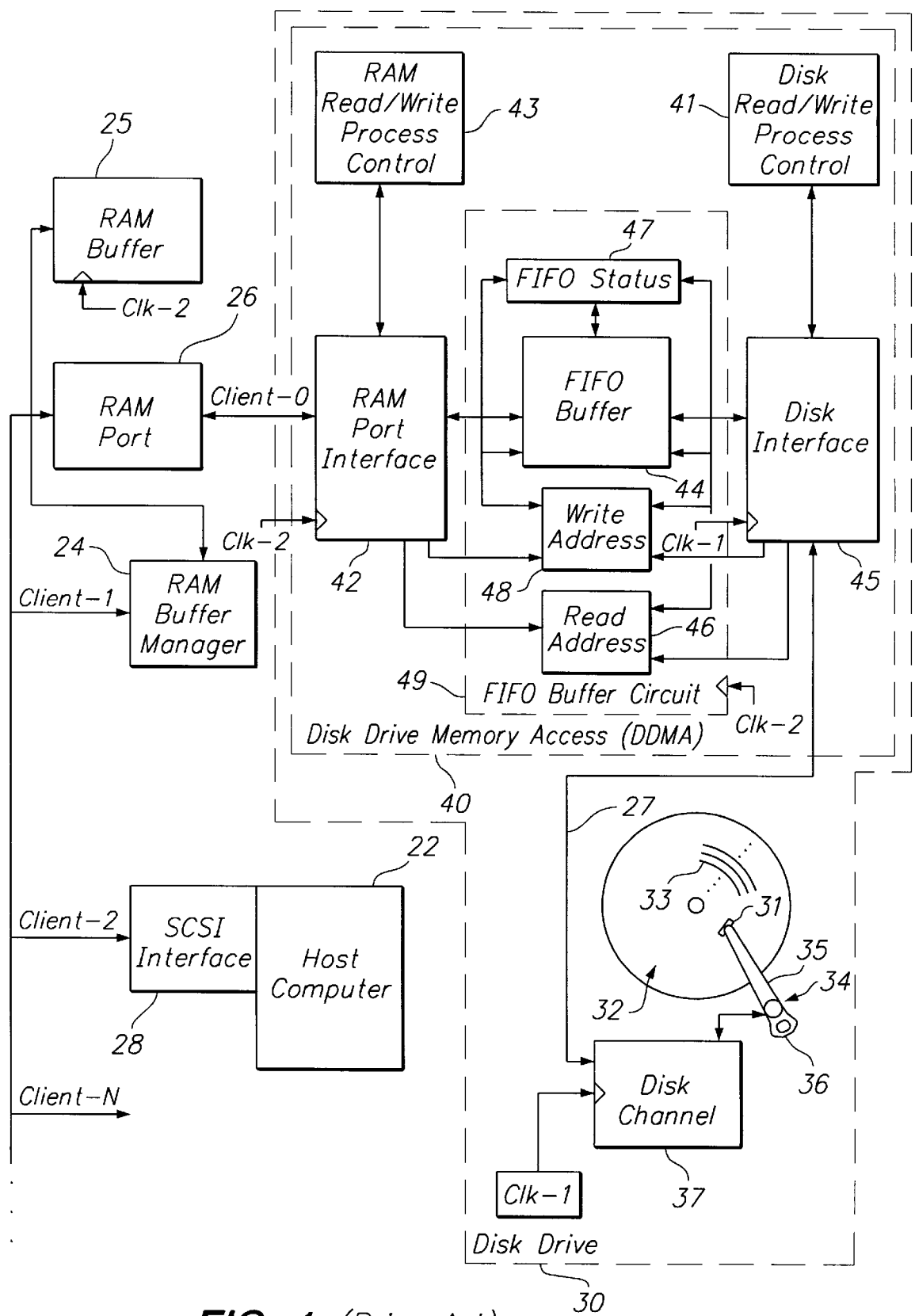
FIG. 1 is a high level block diagram of a conventional first-in-first-out (FIFO) buffer circuit within a disk drive system for buffering data between a disk process synchronized to a disk read-write clock and a RAM buffer process synchronized to a second clock. Connection of the disk drive system via an interface to a host computer is also shown.
Figure 2:
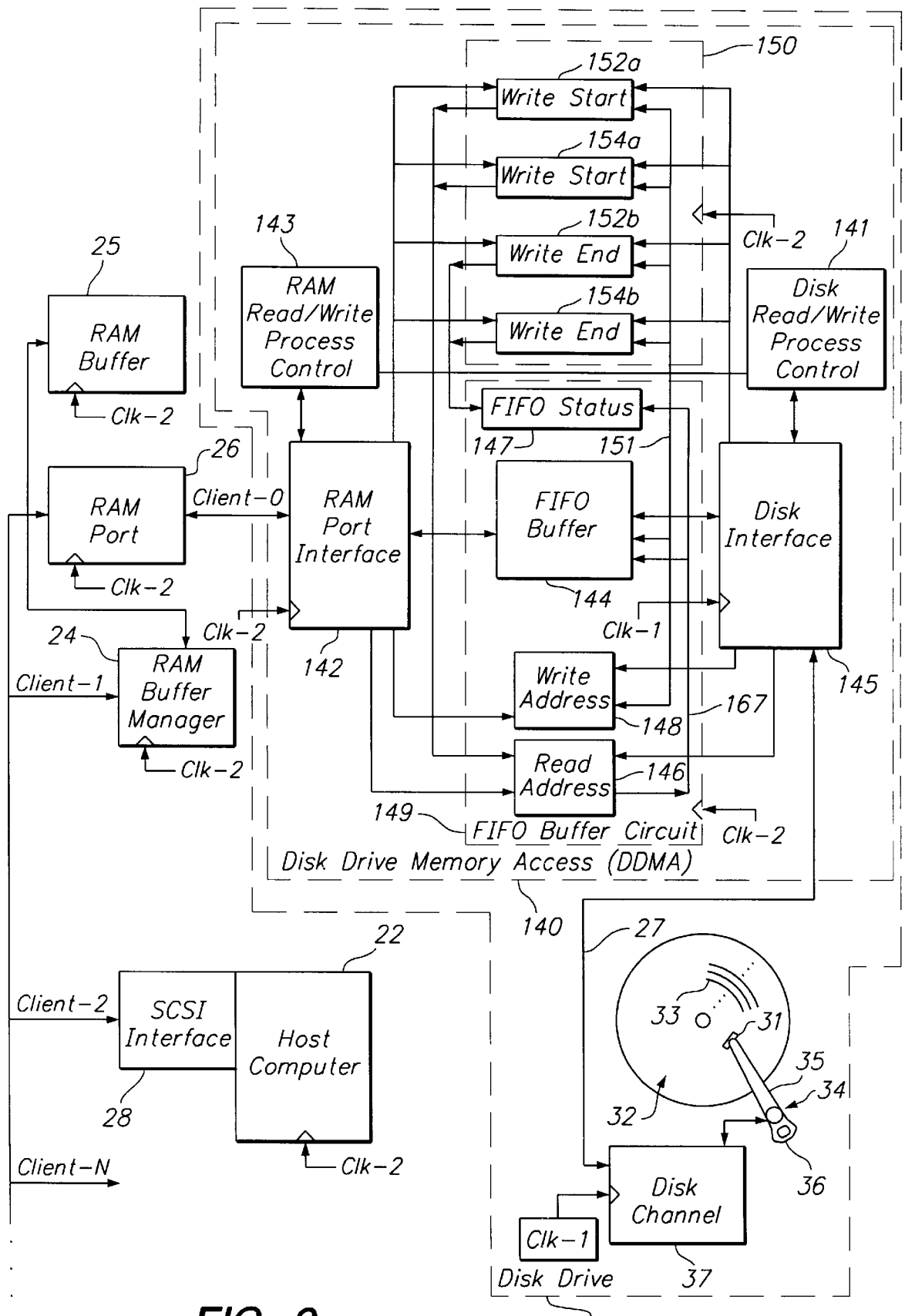
FIG. 2 is similar to FIG. 1 and shows a high level block diagram of a first-in-first-out (FIFO) buffer control circuit in accordance with principles of the present invention for buffering multi-block data flow between a disk process synchronized to a disk read-write clock and a RAM buffer process synchronized to a second clock, without data overlap.

Referring to FIG. 2, a disk drive 130 including a DDMA 140 having one preferred embodiment of the present invention is set forth. The DDMA 140 controls the bi-directional transfer of data between first and second asynchronous data processing systems, such as a random-access-memory (RAM) buffer 25 and a disk channel 37 of a disk drive system 130. In FIG. 2, elements which remain essentially unchanged from the previously discussed FIG. 1 example are assigned the same reference numeral. The RAM buffer 25 includes one or a plurality of electronic data storage dynamic random access (DRAM) or static random access (SRAM) integrated circuit memory chips for storing data that may subsequently be accessed by the host computer processor 22 via the SCSI interface 28. The RAM Port 26 circuit provides arbitration among the number of clients, including the RAM buffer manager 24, for direct communication with the RAM buffer 25 and/or the DDMA 140. The RAM Port 26 circuit is coupled to the disk drive via disk-direct-memory-access (DDMA) 140 circuit which embodies principles of the present invention.

The FIFO buffer 144 includes a data storage space or FIFO buffer space 149. In one preferred implementation, the dimensions of the FIFO buffer 149 is a row width of thirty-two bits by thirty-two rows (32×32 memory array). The FIFO buffer 144 further includes a read-pointer address register 146 that stores a read-pointer address associated with a location in the FIFO buffer 144 where data is read. Additionally, the FIFO buffer 144 includes a write-pointer address register 148 that stores a write-pointer address associated with a location in the FIFO buffer 144 where data is written. So far, the description of the FIFO buffer 144 is essentially the same as the FIFO buffer 44 of FIG. 1.

A bank of FIFO write address registers 150 is coupled to a FIFO buffer 144 as well as to a RAM Port Interface circuit 142 and a disk drive interface circuit 145. The bank of FIFO address registers 150 includes four FIFO buffer write address registers, a first write-start register 152*a*, a first write-end address register 152*b*, a second write-start register 154*a*, and a second write-end register 154*b*. The registers 152*a*, 152*b*, 154*a* and 154*b* have parallel inputs connected to receive addresses from a write-pointer address register 148. Write-start address registers 152*a* and 154*a* have outputs connected in parallel leading to read-pointer address register 146. Write-end address registers 152*b* and 154*b* have outputs connected in parallel leading to a FIFO status detection circuit 147.

The first write-start address register 152*a* is controlled to capture and save the beginning write-pointer address associated with the beginning of a first data block to be written to the FIFO buffer 144. The first write-end address register 152b is controlled to pass the active write pointer through the FIFO status logic, or capture and save an ending write-pointer address associated with the ending of the first data block written to the FIFO buffer 144.

The second write-start address register 154a is controlled to capture and save the beginning write-pointer address associated with beginning of a second data block to be written to the FIFO buffer 144. Furthermore, the second write-end address register 154b is also controlled to pass the active write pointer through the FIFO status logic, or capture and save an ending write-pointer address associated with the ending of the second data block transferred to the FIFO buffer 144. In this manner, both the first pair of FIFO address registers 152a, 152b, and the second pair of FIFO address registers 154a and 154b, capture and save the beginning and ending write-pointer addresses associated with first and second data blocks written to the FIFO buffer 144. The captured address pointers enable the FIFO buffer 144 to store segments of multiple data blocks without overlapping data between the data blocks and without data corruption in the event of an aborted data transfer operation.

When a data block is being transferred from the RAM buffer 25 to the disk channel 37, control of the address registers is by the RAM Port interface 142 under the direction of a RAM read/write process control 143. When a data block is being transferred from the disk channel 37 to the RAM buffer 25, control of the address registers is by the Disk interface 145 under the direction of a disk read/write process control 141. Suitable multiplexing enables dual access to the address registers 152a, 152b, 154a, and 154b via both the RAM port interface 142 and the disk interface 145.

The FIFO buffer 144 further includes a FIFO status detection circuit 147. The FIFO status detection circuit 147 includes a comparator for comparing an address held in the read-pointer address register 146 with an address held in the write-pointer address register 148 in order to determine the number of data segments currently held in the FIFO buffer 144. More precisely, the FIFO status detection circuit 147 compares the address held in the read-pointer address register 146 with an incrementing write-pointer address value held in either register 152b or 154b. This incrementing write-pointer address held in either register 152b or 154b, which is generated by the write-pointer address register 148, increments until an end of a data segment is reached, whereupon this address or write-end address held in either register 152b or 154b is captured and stored therein. At this point, the FIFO status detection circuit 147 compares the address held in the read-pointer address register 146 with the captured and stored write-end address held in either register 152b or 154b. In comparing the write-pointer address with the read-pointer address in such a manner, information such as whether the FIFO buffer 144 is full, half-full, or empty is readily determined.

Figures 3, 3A:
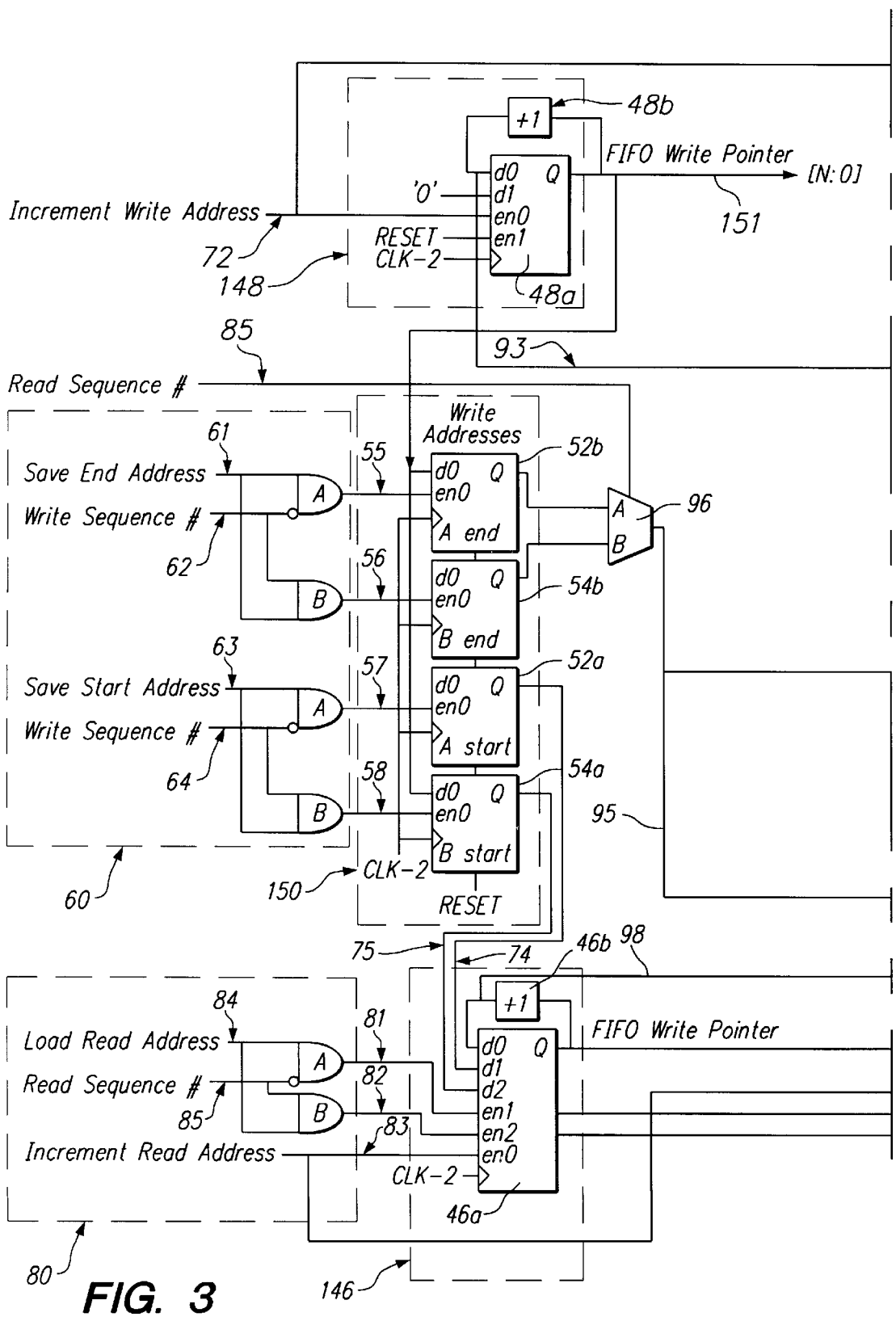
FIG. 3 exemplifies a circuit implementation of the FIG. 2 FIFO buffer control circuit in accordance with principles of the present invention.
Figure 3B:
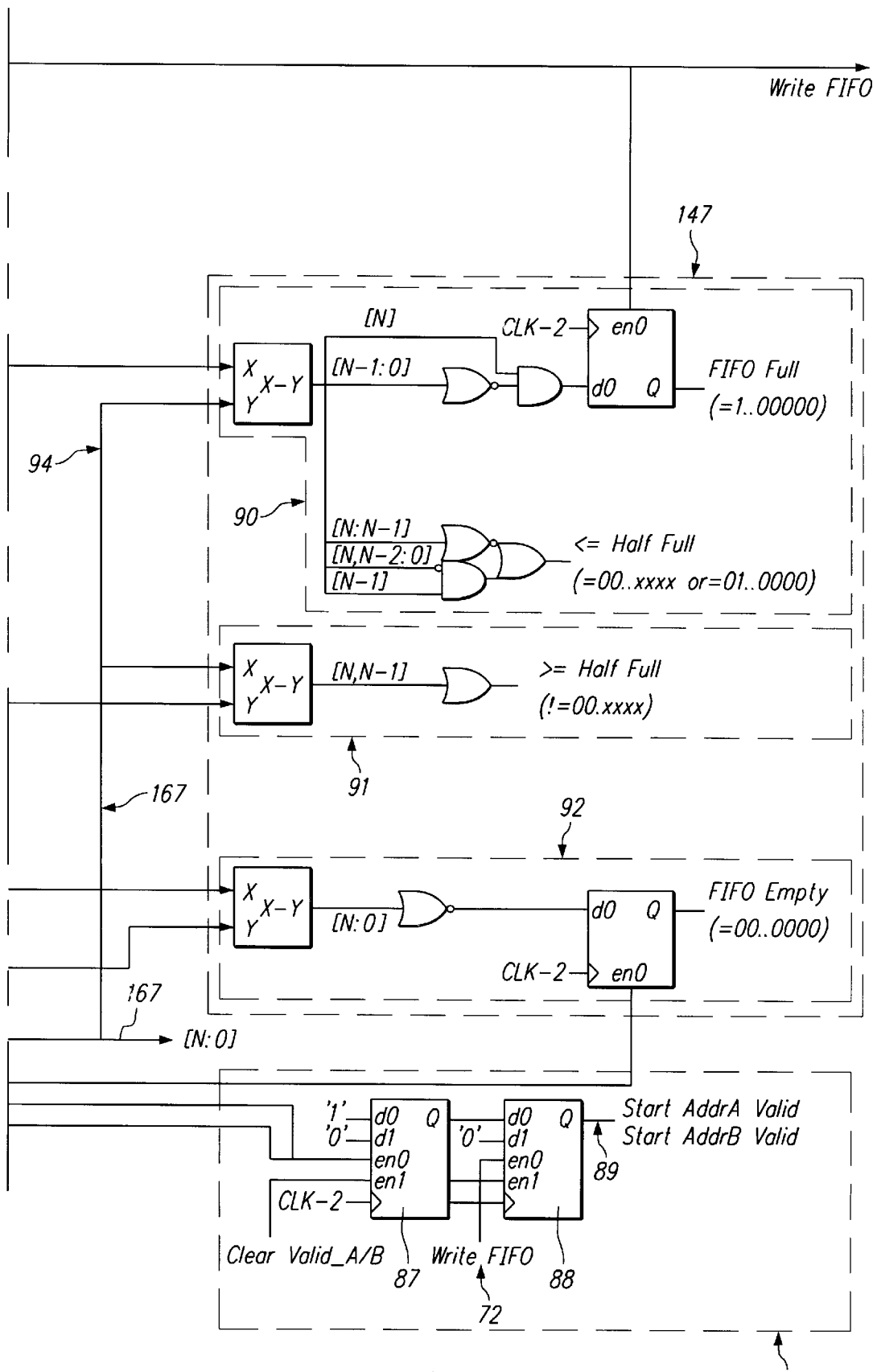

FIG. 3 exemplifies one preferred circuit implementation of the FIG. 2 FIFO DDMA circuit 140. In this embodiment of the present invention, the bank of address registers 150 includes four multiplexer flip-flops (MUX-flops) 52a, 52b, 54a and 54b which implement FIFO buffer address registers 152a, 152b, 154a and 154b respectively. Each of the MUX-flops receives an enable control signal over lines 55–58 from a write-state control circuit 60. The write-state control circuit 60 includes combinatorial logic coupled with the RAM Port interface 142 and the Disk Drive interface 145. Depending on which interface is enabled for writing data to the FIFO buffer 144, the controlling interface 142 or 145 provides several control signals to the write-state control circuit 60 including: save write-start address over line 63, and a write block sequence number over line 62; and save write-end address over line 61. For example, a first block A is assigned a write sequence number of 0, while a second block B is assigned a write sequence number of 1. A third block C is assigned a write sequence number of 0, etc.

Activation of the save write-start address over line 63, and its associated write sequence number control signals over line 62 causes one of the write-start flip-flops 52a or 54a to capture and save the start-write pointer address value for the identified block at a particular instant in time. This captured and saved address value is associated with the beginning of a data block that is imminently to be written to the FIFO buffer 44.

Similarly, activation of the save end address over line 61, and its associated write sequence number over line 62 again causes one of the write-end flip-flops 52b or 54b to capture and save the write-end pointer address value for the identified block at a particular instant in time. However, this captured and saved address pointer is associated with an ending of the identified data block written to the FIFO buffer 44. The write sequence control signals received on line 62 enable the write-state control circuit 60 to capture and save the beginning and ending write-pointer addresses associated with the same block of data.

The bank of registers 150 receives the FIFO buffer write-pointer address values from the write-pointer address register circuit 148 over a line 49. The write-pointer address register circuitry 148 includes a single MUX-flop 48a connected to receive an increment-write-address control signal over a line 72 from either the disk drive interface 142 or the RAM Port interface 145, depending on which one is enabled for writing data to the FIFO buffer 144. The increment-write-address control signal on line 72 enables the write-pointer address register 148 to increment the write pointer address value stored therein as each data segment is written to a row of the FIFO buffer 144. An adder 48b adds a binary one to the output of the write MUX-flop 48a on a write-address bus 49 and feeds that value back to a data input of the MUX-flop 48a. The write-address bus 49 is connected to address the FIFO buffer array 149 as well as to provide starting and ending block addresses to the address register bank 150.

The read-pointer address circuit 146 is also coupled to the outputs of the write-start address registers 52a and 54a. The read-pointer address circuit 146 receives address values from the address register 52a over a line 74 and receives address values from the address register 54a over a line 75. The values received over lines 74, 75 are indicative of the beginning row address of a data block to be read from FIFO buffer 144. Line 74 provides a value indicative of the write-start address associated with a first data block written to the FIFO buffer 144. Similarly, line 75 provides another value indicative of the write-start address value associated with a second data block written to the FIFO buffer 144.

The read-pointer address circuit 146 includes a single MUX-flop 46a, which accepts the saved write-start address values received from a MUX-flop 52a or 54a via line 74 or 75. Additionally, the read-pointer address circuit 146 receives control signals from a read-state control circuit 80 over lines 81–83. The read-state control circuit 80 includes combinatorial logic that receives a control signal from either the disk drive interface 145 or the RAM Port interface 142, depending on data flow direction and which of the two are enabled for reading data from the FIFO buffer 144. The control signals received by the read-state control circuit 80 include: load read address over line 84, a block read sequence number, i.e., zero or one, over a line 85, and an increment read address over a line 83. The load read address control signal on line 84 enables the write-start address of a data block held in a write-start MUX-flop 52*a* or 54*a* to be loaded into the read-pointer address register circuit 146. The read sequence control signal on line 85 enables the read pointer address register circuit 146 to select either MUX-flop 52*a* or 54*a* for reading either the first or the second data block written to the FIFO buffer 144. The increment read address pointer control signal on line 83 enables the ead-pointer address register circuit 146 to increment the MUX-flop 46*a* as each data segment (row) is read from the FIFO buffer 144. An adder 46*b* adds a binary one to an output of the read address MUX-flop 46*a* on a read address bus 47 and feeds the sum to a data input of the MUX-flop 46*a*.

The FIFO buffer status circuit 147 includes a first comparator 90, a second comparator 91, and a third comparator 92. The first comparator circuit 90 compares the next FIFO buffer write address value input to the write-pointer address circuit 148 via a path 93 with a FIFO buffer read address value input to the read-pointer address circuit 146 via a path 94. The first comparator circuit 90 subtracts the read address value from the write address value and determines from the difference whether the FIFO buffer 144 is either less than or equal to half full or whether the FIFO buffer 144 is full.

The second comparator circuit 91 receives a registered current write or write-end address value from one of the write-end address registers 52*b* or 54*b* via a path 95 from a multiplexer circuit 96. This address value may be actively following the current write address pointer 48*a*, or the captured and stored write-end address if all data has been written to the FIFO buffer 144. The multiplexer circuit 96 selects between the saved write-end address of a first data block or the saved write-end address of a second data block previously captured and saved in the bank 150. The multiplexer circuit 96 selects between these saved addresses based on the read sequence control signal transmitted to the multiplexer over line 85. Additionally, the second comparator circuit 91 receives the current FIFO read address value from the read-pointer address circuit 146 over FIFO read address path 47. Thereafter, the second comparator circuit 91 subtracts the current FIFO read address value from the selected block write-end address value received from one of the write-end registers 52*b* and 54*b* via multiplexer 96 in order to determine if the FIFO buffer 144 is greater than half full.

Finally, the third comparator circuit 92 subtract s a next row read address taken from the input of the read address MUX-flop 46*a* from the registered write-end address value from one of the write-end registers 52*b*, or 54*b* as selected by multiplexer 96 and provided over path 95 to determine if the FIFO buffer 44 is empty.

It is important to note that the saved write address on line 95 is equal to, and changes with, the write-pointer address 48*a* on line 49 until a save is requested via line 55 or 56.

Optionally, a write-address validation circuit 86 for each block A and B is coupled with the read-pointer address circuit 146 and read-state control circuit 80 for verifying that a data block associated with the saved write-start address previously captured and saved in the bank of registers 150 was actually written. The write-address validation circuit 86 includes a first MUX-flop 87 coupled with a second MUX-flop 88 whereby the first MUX-flop 87 is enabled if either sequence of the read-pointer address register circuit 146 is loaded with a read address value. Thereafter, the second MUX-flop 88 puts out a valid signal on line 89 when the write-pointer address register 148 is incremented via line 72, thereby writing data to the first FIFO buffer 144 location.

Referring to FIGS. 2, 4, and 5, the RAM Port Interface circuit 142 includes a state machine which implements two control processes illustrated in the flow outlines in FIGS. 4 and 5. Similarly, the disk interface circuit 145 also includes a state machine which implements the two control processes illustrated in the flow outlines in FIGS. 4 and 5. When the RAM Port Interface circuit 142 is executing the FIG. 4 flow diagram, the disk interface circuit 145 will be executing the FIG. 5 flow diagram. This enables the RAM port interface 142 to write data to the FIFO buffer 144 and enables the disk interface circuit 145 to read the data from the FIFO buffer 144. Alternatively, when the RAM Port Interface circuit 142 is executing the FIG. 5 flow diagram, the disk interface circuit 145 will be executing the FIG. 4 flow diagram. This enables the RAM port interface 142 to read data from the FIFO buffer 144 and enables the disk interface circuit 145 to write data to the FIFO buffer 144.

In transferring data from the RAM asynchronous system or RAM buffer 25 to the second asynchronous system or disk drive system 30, the RAM Port Interface circuit 142 receives a command to start writing data blocks to the FIFO buffer 144 at step 400. Prior to writing the first data block to the FIFO buffer 144, the disk read process control 141 circuit is enabled to permit the disk drive interface to read data from the FIFO buffer 144 and the RAM read process control 143 circuit is enabled to permit the RAM Port interface 142 to write data to the FIFO buffer 144 at step 405.

Next, the RAM Port Interface 142 sends a control signal to the FIFO buffer 144 to determine if there is space in the FIFO to accommodate data to be written therein at step 410. In the event the FIFO buffer 144 is full, the data transfer process pauses at step 410 until there is space available for data in the FIFO buffer 144. Once it is determined that there is space available in the FIFO buffer 144 for data at step 410, then a start-write address associated with the beginning of the data block to be written to the FIFO buffer 144 is captured and saved at step 420. This start-write address is saved in the first start-write register 52*a* defined within the first pair 152*a*, 152*b* of registers incorporated within the bank of registers 150.

Thereafter, data segments (FIFO rows) of the first data block are sequentially written to the FIFO buffer 144 at step 430. At the same time, the RAM Port Interface 142 sends a control signal to the write-pointer address register 148 to increment the write-pointer address stored therein at step 440 as each data segment is written to the FIFO buffer 144. The write-pointer address is incremented at step 440 until the first data block has been successfully written to the FIFO buffer 144. However, the process of writing data segments to the FIFO buffer 144 may pause, if it is determined in step 455 that the FIFO buffer 144 does not have space for data to be written. Upon detecting the end of this first data block at step 450, the write pointer address is captured and saved in the first write-end register 152*b* at a step 460.

After writing the first data block to the FIFO buffer 144, it is determined at a step 470 whether another data block needs to be written to the FIFO buffer 144, and if not, the process ends at step 480. On the other hand, if it is determined that another data block needs to be written to the FIFO buffer 144, the write-pointer address register 148 is permitted to continue incrementing concomitant with data segments defined within the next successive data block that is written to the FIFO buffer 144. However, the beginning and ending addresses of this next data block are captured and saved in the second pair 154a, 154b, of FIFO buffer address registers. After the next successive data block has been written to the FIFO buffer 144, a third successive data block is written thereto. However, the beginning and ending write-pointer addresses of this data block are captured and stored in the first pair 152a, 152b, of FIFO buffer address registers defined within the bank 150. In accordance with the FIG. 4 flow process, the first pair 152a, 152b, and the second pair 154a, 154b, of FIFO buffer address registers alternate in capturing and storing the beginning and ending write-pointer addresses for the plurality of data blocks written to the FIFO buffer 44. Additionally, depending upon the size of the FIFO buffer 144, the bank 150 of FIFO address registers may be expanded by adding additional pairs of address registers (not shown) connected in parallel with registers 152a, 152b, and 154a, 154b. In such an arrangement, segments of more than two data blocks can simultaneously occupy the FIFO buffer 144 at the same time.

Referring to FIGS. 2 and 5, the disk drive interface 145 receives a command to begin reading data from the FIFO buffer 44 at a step 500. Thereafter, the disk drive interface circuit 145 determines if the FIFO buffer 144 has accumulated a predetermined number of data segments at step 510 defined within the first data block. When it is determined in step 510 that the FIFO buffer 144 contains data to be read, the disk drive interface 145 loads the read-pointer address register 146 with the FIFO buffer 144 write-pointer address previously saved in the first start-write register 152a at step 520. When data is available for reading from the FIFO buffer 144, the disk drive interface 145 reads data from the FIFO buffer 144 at step 530. At the same time, the disk drive interface 145 sends a control signal to the read-pointer address register 146 to increment the read-pointer address stored therein concomitant with each data segment read from the FIFO buffer 144 at step 540. The read-pointer address register 146 is incremented until the first data block has been successfully read from the FIFO buffer 144 at step 530. Upon detecting the end of this first data block at step 560, the disk drive interface 145 determines if another data block needs to be read from the FIFO buffer 144 at step 570, and if so, the read-pointer address register 146 is loaded with the FIFO buffer 144 write-pointer address previously saved in the second start-write register 154a. Thereafter the above process is repeated at step 580 for reading the second data block from the FIFO buffer 144. If the disk drive interface 145 determines that there are no additional data blocks waiting in the FIFO buffer 144 to be read, then the read process ends at step 590.

During the process of writing and reading the first data block to/from the FIFO buffer 144, the FIFO status detection circuit 147 compares the active read-pointer address register 146 (incrementing) with the active write-pointer address register 148 (incrementing) to determine when the first data block has been completely written to and read from the FIFO buffer 144. After the first data block has been transferred, however, the FIFO buffer status register 147 switches from comparing the active read-pointer address register 146 with the active write-pointer address register 148 to comparing the active read-pointer address register 146 with a static write-pointer address saved in the first write-end register 152b. In this manner the FIFO status detection circuit 147 compares pointer addresses associated with the same block of data and provides a delineation control between adjacent data blocks written to the FIFO buffer 144.

In the event of an interruption of reading a first data block (block abort process), the read-pointer address register 146 is reloaded with the previously saved write-start address of the next successive data block that is being written to the FIFO buffer 144. In this manner, the read-pointer address register 146 is jumped to the beginning of the next successive data block for continuing the process of reading data from the FIFO buffer 44 and thereby skips data segments of the now-aborted first block which may still be present within the FIFO buffer 144.

The above described method and circuit for controlling a FIFO buffer 144 has many advantages over the prior art, such as, enabling more than one data block to occupy the FIFO buffer 144 simultaneously without data overlap between adjacently successive data blocks. Additionally, the method and circuit for controlling a FIFO buffer 144 does not require the write-pointer address register 148 or the read-pointer address register 146 to be reset after each data block transfer is completed. Rather, the read-pointer address register 146 and the write-pointer address register 148 can continue to increment until reaching a maximum counter count value, whereby the read/write address pointers wrap around to zero and counting is continued without latency.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A first-in-first-out (FIFO) buffer control circuit to buffer data that is bi-directionally transferred between first and second asynchronous data handling systems, comprising:
   a FIFO buffer for buffering data between the first and second asynchronous systems;
   a read-pointer address register that stores a read-pointer address associated with a location in the FIFO buffer where data is read;
   a write-pointer address register that stores a write-pointer address associated with a location in the FIFO buffer where data is written;
   a bank of FIFO address registers including:
      (i) a first pair of FIFO buffer address registers coupled with the write-pointer address register for capturing and saving beginning and ending write-pointer addresses associated with a first data block written to the FIFO buffer, and
      (ii) a second pair of FIFO buffer address registers coupled with the write-pointer address register for capturing and storing beginning and ending write-pointer addresses associated with a second data block written to the FIFO buffer,
      wherein the bank of FIFO address registers captures and saves the beginning and ending write-pointer addresses held in the write pointer address register that are associated with segments of the first and second data blocks residing within the FIFO buffer register at the same instant in time; and
   control means for enabling the FIFO buffer register to accommodate said segments of said first and second data blocks without overlap.

2. The FIFO buffer control circuit of claim 1, wherein the control means includes a FIFO status detection circuit for comparing the read-pointer address with an active write-pointer address to determine the number of data segments currently held in the FIFO buffer.

3. The FIFO buffer control circuit of claim 1, wherein the control means includes a FIFO status register for comparing the read-pointer address with a static/active write-pointer address to determine the number of data segments defined within a first data block held in the FIFO buffer and to permit the write pointer to continue incrementing its address in correspondence to the second data block written to the FIFO buffer.

4. The FIFO buffer control circuit of claim 1, wherein the write-pointer address register is coupled by the control means with the first and the second asynchronous data handling systems, the write-pointer address register being further coupled with the bank of FIFO address registers, whereby the write pointer address register receives a control signal from the first or the second asynchronous data handling system for incrementing the write-pointer address stored therein as a data segment of said first or second block is written to the FIFO buffer.

5. The FIFO buffer control circuit of claim 1, wherein the read-pointer address register is coupled by the control means with the first and the second asynchronous system, the read-pointer address register being further coupled with the bank of FIFO address registers, whereby the read-pointer address register receives a control signal from the first or the second asynchronous system for initializing the read-pointer address register with the write pointer-address associated with the beginning of a data block written to the FIFO buffer.

6. The FIFO buffer control circuit of claim 5, wherein the read-pointer address register further receives a control signal via the control means from the first or the second asynchronous system for incrementing the read-pointer address stored therein concomitant with data segments read from the FIFO buffer.

7. The FIFO buffer control circuit of claim 6, wherein in the event of a data block transfer interrupt the read-pointer address register further receives a control signal via the control means from the first or the second asynchronous system for loading the read-pointer address register with the write-pointer address associated with the beginning of a next successive data block written to the FIFO buffer.

8. The FIFO buffer control circuit of claim 1, wherein the control means includes a first control system associated with the first asynchronous data handling system, and a second control system associated with the second asynchronous data handling system, and wherein the bank of FIFO address registers receives a control signal from either the first control system or the second control system for capturing and storing the write-pointer address held in the write-pointer address register.

9. The FIFO buffer control circuit of claim 1, wherein the first asynchronous system includes a random-access-memory (RAM) buffer coupled to the FIFO buffer register via a RAM port interface included within the control means, the RAM buffer being further coupled with a host computer system.

10. The FIFO buffer control circuit of claim 1, wherein the second asynchronous system includes a disk drive storage system coupled to the FIFO buffer via a disk interface included within the control means.

11. A method of controlling a first-in-first-out (FIFO) buffer circuit to manage the bi-directional transfer of data blocks between first and second asynchronous data handling systems, the FIFO buffer circuit including a FIFO buffer, a read-pointer register, a write-pointer register, and a buffer status register, the FIFO buffer circuit being coupled with the first and the second asynchronous systems, the FIFO buffer being further coupled with a bank of FIFO buffer address registers, the bank of FIFO buffer address registers including a first pair and a second pair of registers, the first pair of registers having a first start-write register and a first end-write register, the second pair of registers having a second start-write register and a second end-write register, the method comprising the steps of:

A. enabling the first asynchronous system to write a first data block to the FIFO buffer;

B. enabling a first read/write process control circuit for permitting a data segment of the first data block to be written to the FIFO buffer;

C. determining if there is space available in the FIFO buffer for the data of the first data block to be written;

D. saving a start-write address associated with the beginning of the first data block written to the FIFO buffer;

E. writing the first data block to the FIFO buffer;

F. incrementing the write-pointer address register as each data segment of the first data block is written to the FIFO buffer;

G. detecting and saving an end-write address associated with the ending of the first data block written to the FIFO buffer, wherein the start-write address and the end-write address define the beginning and ending addresses of the first data block written to the FIFO buffer for enabling the FIFO buffer to accommodate more data blocks than the first data block simultaneously without data overlap; and H. determining if the first asynchronous system is being commanded to write another data block to the FIFO buffer, and if so, then repeating steps A through F, and if not, then ending.

12. The method of controlling a first-in-first-out (FIFO) buffer circuit of claim 11, further comprising the steps of:

I. enabling a second asynchronous system to read a first data block from the FIFO buffer;

J. enabling the second read/write process control circuit for permitting data segments of the first data block to be read from the FIFO buffer;

K. determining if a segment of the first data block is available in the FIFO buffer for reading the data block segment therefrom;

L. saving a first-read address associated with the beginning of the first data block read from the FIFO buffer;

M. reading the segments of the data block from the FIFO buffer and incrementing the read-pointer address register;

N. detecting the end-write address associated with the ending of the first data block previously written to the FIFO buffer; and O. determining if the second asynchronous system is being commanded to read another data block from the FIFO buffer, and if so, then repeating steps I through O, and if not, then ending data buffering in the FIFO buffer.

13. The method of controlling a first-in-first-out (FIFO) buffer circuit of claim 11, wherein step D includes saving the start-write address associated with the beginning of the first data block written to the FIFO buffer in the first start-write register defined within the first pair of registers incorporated within the bank of registers.

14. The method of controlling a first-in-first-out (FIFO) buffer circuit of claim 13, wherein step D further comprises saving the start-write address associated with the beginning of another data block written to the FIFO buffer in a second start-write register defined within the second pair of registers incorporated within the bank of registers.

15. The method of controlling a first-in-first-out (FIFO) buffer circuit of claim 11, wherein step G includes saving the end-write address associated with the ending of the first data block written to the FIFO buffer in the first end-write register defined within the first pair of registers incorporated within the bank of registers.

16. The method of controlling a first-in-first-out (FIFO) buffer circuit of claim 15, wherein step G further includes saving the end-write address associated with the ending of the another data block written to the FIFO buffer in the second end-write register defined within the second pair of registers incorporated within the bank of registers.

17. The method of controlling a first-in-first-out (FIFO) buffer circuit of claim 13, wherein the first pair and the second pair of registers incorporated within the bank of registers alternate in saving the beginning and ending write-pointer addresses of a sequence of first and another data blocks written to the FIFO buffer.

18. The method of controlling a first-in-first-out (FIFO) buffer circuit of claim 12, wherein step M further comprises determining if the first data block being read has been interrupted and if an interruption has occurred, the method further comprises loading the read pointer address register with the previously saved write-pointer address associated with the beginning of another data block written to the FIFO buffer.

19. The method of controlling a first-in-first-out (FIFO) buffer register control circuit of claim 1, wherein the first asynchronous system is a host computer system and the second asynchronous system is a disk drive system.

20. A FIFO buffer circuit including a FIFO buffer for temporary storage of bounded data blocks of predetermined length being transferred asynchronously from a data source to a data destination, each data block having a data length in excess of a data storage capacity of the FIFO buffer, the FIFO buffer comprising addressable rows, each row for storing a segment of a said data block, the FIFO buffer circuit including:

a write address register for pointing to each row of the FIFO buffer to be written by the data source in accordance with a write address, a read address register for pointing to each row of the FIFO buffer to be read by the data destination in accordance with a read address, a plurality of pairs of write-address capture registers communicating with the write address register and the read address register and comprising at least:

a first capture register pair including a first write-start capture register for capturing an address corresponding to a starting row address of a first said data block, and a first write-end capture register for capturing an address corresponding to an ending row address of the first said data block, and a second capture register pair including a second write-start capture register for capturing an address corresponding to a starting row address of a second said data block, and a second write-end capture register for capturing an address corresponding to an ending row address of the second said data block; and FIFO buffer control means for controlling the plurality of pairs of write address capture registers and the write address register and the read address register for enabling segments of the first and second data blocks to be written to and read from rows of the FIFO buffer without overlap and without interruption at data block boundaries.

21. The FIFO buffer circuit set forth in claim 20 wherein the FIFO buffer circuit is adapted to provide bi-directional data flow such that a data source can be a data destination and a data destination can be a data source.

22. The FIFO buffer circuit set forth in claim 21 wherein the FIFO buffer is included within a data storage device and wherein a first data source/destination comprises a data storage channel, and wherein a second data source/destination comprises a random access memory buffer array.

23. The FIFO buffer circuit set forth in claim 22 wherein the data storage device comprises a disk drive and wherein the first data source/destination comprises a disk data channel and the second data source/destination comprises a disk buffer memory.

* * * * *